United States Patent

[11] 3,557,898

| [72] | Inventors | Raymen F. Emery<br>Lutherville;<br>Samuel P. Mirabile; Michael Slavin;<br>George T. Bata, Baltimore, Md. |
|---|---|---|
| [21] | Appl. No. | 773,598 |
| [22] | Filed | Nov. 5, 1968 |
| [45] | Patented | Jan. 26, 1971 |
| [73] | Assignee | The Bendix Corporation<br>a corporation of Delaware |

[54] VEHICLE TOP SPEED LIMITER
9 Claims, 2 Drawing Figs.

[52] U.S. Cl. .................................................. 180/108,
123/103
[51] Int. Cl. ...................................................... B60k 31/00
[50] Field of Search ............................................ 180/105-
—110; 123/102, 103

[56] References Cited
UNITED STATES PATENTS

| 1,055,741 | 3/1913 | Halbleib ...................... | 180/105 |
| 3,062,312 | 11/1962 | Dietrich et al. ............... | 123/102 |
| 3,157,244 | 11/1964 | McMurray et al. ........... | 180/108 |
| 3,198,280 | 8/1965 | Van Ostrom ................. | 180/108 |
| 3,291,246 | 12/1966 | Colling et al. ................ | 180/106X |
| 3,455,411 | 7/1969 | Carp et al. .................... | 180/105 |

*Primary Examiner*—Kenneth H. Betts
*Attorneys*—Plante, Arens, Hartz, Hix and Smith, Bruce L. Lamb, William G. Christoforo and Lester L. Hallacher ABSTRACT: A system for preventing the velocity of a vehicle from exceeding a predetermined maximum irrespective of the intentional or accidental actions of the driver. The system is designed such that as the vehicle approaches a maximum predetermined speed the acceleration of the vehicle is limited until the maximum speed is obtained, at which time the vehicle can no longer be accelerated. A valve connects a rolling diaphragm air motor between the intake manifold and the exhaust system of the vehicle such that the air motor is sensitive to the pressure differential across these two elements. When the vehicle is below the maximum speed both sides of the air motor are subject to the exhaust pressure and consequently no motion is obtained from the motor. As the vehicle approaches the maximum speed, the one side of the air motor is gradually changed from exhaust pressure to the lower pressure present in the intake manifold. This causes a diaphragm in the air motor to move a mechanical lever. This lever is connected to the fuel control system from the driver. The mechanical linkage between the fuel control system and the air motor is designed such that the driver can neither intentionally nor accidentally override the effects of the limiting system.

PATENTED JAN 26 1971 3,557,898

INVENTORS
RAYMEN F. EMERY
SAMUEL P. MIRABILE
MICHAEL SLAVIN
GEORGE T. BATA
BY
*Luther L. Wallacher*
ATTORNEY

VEHICLE TOP SPEED LIMITER

Since the advent of the automobile and types of internal combustion engine-driven vehicles there have been many attempts to limit the maximum speed at which a vehicle can be driven. Most present day devices, commonly called governors, utilize mechanical elements operating on principles of centrifugal force. Other types of devices which operate in a similar manner are manually set upon installation. Another type of device has a mechanical linkage which limits the speed of the vehicle by the movement of levers at the maximum velocity. After the vehicle is under the control of the system and later decelerated it is necessary to drop below a certain velocity in order for the system to reset. Although some of these devices operate satisfactorily for certain usages, they also possess certain disadvantages which render them unsuitable for use in the present-day automobiles. A major disadvantage stems from the fact that the device may interfere with the ordinary performance of the automobile engine at speeds below the maximum speed. For example, as the vehicle is approaching the maximum speed the mechanical control device gradually decreases the automobile's ability to be accelerated. This is undesirable because the driver depends upon the acceleration capabilities of the automobile in some instances when he is close to, but under, the maximum velocity. Still other systems require intentional setting or resetting of the control device as the automobile goes into and out of the control of the governor device. Another type of system utilizes the exhaust pressure of the vehicle to control the speed. The primary disadvantage of these systems lies in their inaccuracy. As the vehicle travels terrain which is hilly the exhaust pressure changes considerably for uphill and downhill grades. Consequently, as the vehicle travels uphill it is overcontrolled and cannot approach the set speed, and as it travels downhill it is undercontrolled and can exceed the set speed. These disadvantages have prevented the growth of maximum speed control devices in vehicle usage and have also prevented the regulatory agencies from adopting the requirement of the use of maximum speed devices.

It is therefore an object of this invention to provide a system for preventing the velocity of a vehicle from exceeding a predetermined limit.

It is another object to provide such a system which does not interfere with the performance of the vehicle engine at speeds below the predetermined maximum.

It is another object to provide such a system which cannot be intentionally or accidentally overridden by the driver.

It is another object to provide such a system which does not require the manual setting or resetting to return normal control to the driver.

It is another object to provide such a system which permits the vehicle to be decelerated by the vehicle engine when the driver's foot is removed from the accelerator pedal.

It is another object to provide a system which is operated by the pressure differential between the intake and exhaust manifolds and therefore is very stable for all types of terrain.

Further objects, features and advantages of the invention will become apparent in the following description and claims when read in view of the accompanying drawings wherein like numbers indicate like parts and in which:

Figure 1:
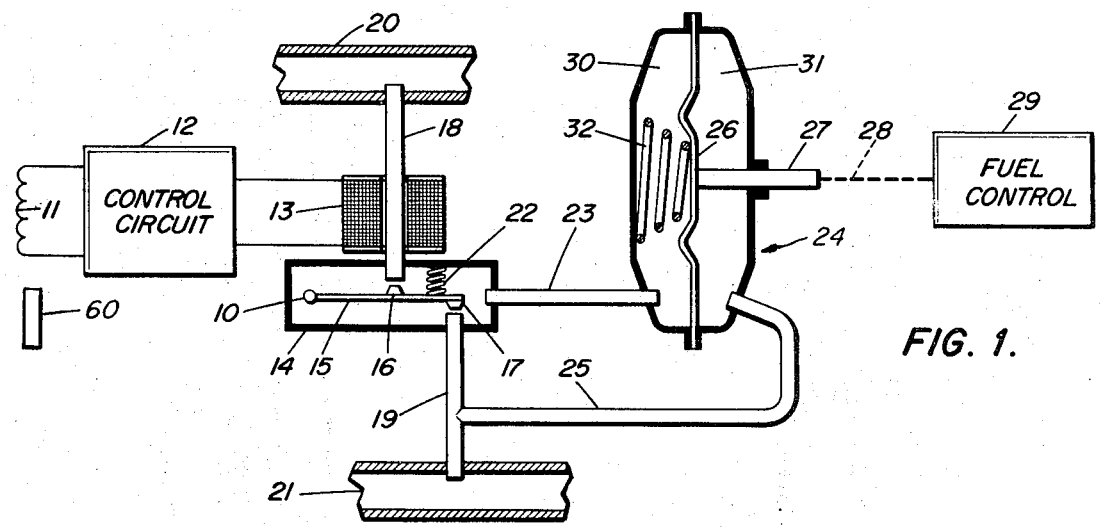
FIG. 1 shows a preferred embodiment of the system.

In FIG. 1 the control unit includes a speed sensor 11. Speed sensor 11 is responsive to a vehicle speed such that the output of the sensor 11 varies in accordance with the speed. The variable characteristic can be either amplitude or frequency, depending upon the type of sensor and the design of control circuit 12. The output of sensor 11 is fed to control circuit 12, the output of which actuates a coil 13.

Two types of operation of the top speed limiter are feasible. In the first type coil 13 is normally unenergized and becomes energized when limiting occurs. In the other type of operation coil 13 is normally energized and becomes unenergized when limiting occurs. Both types of operation can be controlled by the amplitude or frequency characteristic of the sensor 11. The design of control circuit 12 is the primary factor in determining the type of operation. Because the system establishes a maximum speed it is preferable that it cannot be easily disconnected by one wishing to exceed the maximum speed. Also in the case of failure of the system it is preferable that the vehicle be forced to slow down rather than remain at the maximum speed. A control circuit 12 which operates in this manner is fully described in Application Ser. No. 771,580, titled "Speed Sensitive Control Circuit," filed by Ralph W. Carp on Oct. 29, 1968, and assigned to the same assignee as the instant invention.

For convenience the operation of the circuit described in Application Ser. No. 771,580 is briefly presented herein. In the unlimited condition coil 13 is fully energized. As the input to control circuit 12 from sensor 11 increases in frequency control circuit 12 yields a series of pulsed interruptions as its output. The pulses are effective to deenergize coil 13. As an example in a completely unlimited condition coil 13 is continuously energized. As some limiting becomes effective coil 13 will be unenergized a small percentage of the time and energized a large percentage; for example, it may be unenergized 10 percent of the time and energized 90 percent. As the speed of the vehicle approaches the maximum permitted velocity the duration of the pulses in the output of control circuit 12 increases so that the above percentages reverse. Coil 13 is then unenergized a greater percentage of the time and full limiting has occurred.

Referring back to FIG. 1, one may understand the effect of this operation of control circuit 12 on the system by viewing valve 14.

It may be preferable to have the average current through coil 13 decrease as the velocity of the vehicle increases. This type of operation will largely depend on the design of control circuit 12. For this type of operation spring 22 normally biases leaf 15 away from conduit 18. The magnetic field of coil 13 then holds projection 16 in the outlet of conduit 18 at low velocities and the pressures in conduits 23 and 25 are equal. Velocity increases decrease the magnetic field strength until spring 22 is the stronger and limiting begins. This mode of operation is particularly useful in making the system substantially tamperproof.

Valve 14 contains a rotatable rocker 15 which pivots about a pivot point 10. Mounted upon rocker 15 are two valve-closing projections 16 and 17. Projection 16 is located near the outlet orifice of a conduit 18 and projection 17 is located near the outlet orifice of a conduit 19. Projections 16 and 17 are constructed such that they completely close off their respective outlets when closed and rapidly become fully open when changing states caused by changes in the energization state of coil 13. Conduit 18 is connected to the intake manifold of the vehicle engine generally designated by reference number 20. By being so connected when the engine is running conduit 18 is subjected to the vacuum ordinarily present in the intake manifold of an internal combustion engine. Conduit 19 is connected to the crossover of the exhaust manifold of the vehicle generally designated by reference numeral 21. Consequently, during the running of the engine conduit 19 is subject to the exhaust pressure of the engine. When coil 13 is energized it pulls rocker 15 upwardly against the downward force of spring 22. In this position, projection 16 closes off conduit 18. Because conduit 18 is blocked off and conduit 19 is fully open, the sealed chamber 14 is subject to exhaust pressure. Another conduit 23 is connected to one side of the air motor 24. A conduit 25, which can be a branch of conduit 19, is connected to the other side of air motor 24. The two sides of motor 24 are separated by a fluidtight diaphragm 26. Diaphragm 26 is designed such that it will move laterally when subjected to a differential pressure by changes in pressure of conduits 23 and 25, and will return under the influence of spring 32 when pressures are equalized. Permanently attached to diaphragm 26 is a lever 27 which is connected by a mechanical linkage generally designated by 28 to the fuel control of the automobile can be either the throttle plate located within the carburetor, or the cable mechanism which connects the accelerator pedal to the carburetor. In either instance linkage 28 will control the fuel flow to the vehicle engine by movement of lever 27.

In operation, initially projection 16 fully closes conduit 18 and conduit 19 is fully open. As the speed of the vehicle increases, the frequency of the signal picked up by coil 11 increases. This results in a series of pulses on output from control circuit 12 as explained herein above and thereby pulses the magnetic field of coil 13 on and off. When coil 13 is energized conduit 18 is closed and conduit 19 is open. The reverse of this occurs when coil 13 is unenergized. Conduits 18 and 19 are therefore opening and closing at a rate determined by the length of pulses present in the output of control circuit 12. Obviously, there is very short travel time of rocker 15 when both conduits 18 and 19 are open. This has little effect on the operation of the system, and can be minimized in the design of valve 14. As conduit 18 opens and conduit 19 closes the pressure in conduit 23 decreases when that in conduit 25 remains constant. For this reason the pressure in chamber 31 of motor 24 remains constant. For this reason the pressure in chamber 31 of motor 24 remains constant while that in chamber 30 decreases. The opening and closing of conduits 18 and 19 establishes an average pressure in the chamber of valve 14 which chamber thus functions as a pressure storage and averaging means. This average pressure decreases as conduit 18 remains open longer at higher vehicle speeds. A pressure differential is therefore produced across diaphragm 26. The pressure differential is obviously the difference between the exhaust pressure and the pressure in the chamber of valve 14. This pressure differential causes a movement of diaphragm 26 to the left as shown in FIG. 1, resulting in a linear motion of lever 27. Lever 27 therefore gradually actuates the fuel control system and causes the vehicle to be partially limited.

When the vehicle velocity has reached its maximum set limit the pulse output of control circuit 12 is at its maximum and conduit 18 is fully opened a major percentage of the time while conduit 19 is fully closed a major percentage of the time. The average pressure of conduit 23 is approximately the intake manifold pressure and that of conduit 25 is the exhaust pressure. The pressure differential across diaphragm 26 is a maximum and consequently lever 27 has moved its maximum displacement. In this condition the vehicle velocity is fully limited and cannot be increased by the driver either voluntarily or accidentally.

As stated hereinabove, the mode of operation wherein coil 13 is energized when no limiting occurs is optional as the reverse operation can also be used within the scope and intent of the invention. An important advantage of the illustratively presented operation stems from a substantially tamperproof system. This can be more fully understood by referring to the control circuit application cited hereinabove. Another important advantage stems from the fact that coil 13 is unenergized when the ignition system of the vehicle is turned off. The control system is then in full limiting when the vehicle is parked and does not become unlimited until the vehicle is driven away.

Sensor 11 merely represents the coil which senses the magnetic field used in the speed detection device, although any of several devices available can also be used for this function, a very ingenious and uncomplicated method of doing this consists of placing a sensing coil in the presence of the rotating magnet 60 ordinarily present in a speedometer. Because the speedometer already present in the vehicle utilizes a rotating magnet 60, the control signal necessary for an input to control circuit 12 can be taken from a coil 11 placed in the immediate vicinity of this rotating magnet 60. Obviously, because the magnet is part of the vehicle speedometer the rotational velocity of the magnet 60 is directly proportional to the vehicle velocity. This is directly in line with the requirements of the output from the sensor of the instant invention. A complete description of a preferred sensor is disclosed in application Ser. No. 773,597 filed by Ralph L. Miller and Michael Slavin of even date herewith and titled "Electrical Speed Transducer," and assigned to the same assignee as the instant invention.

Figure 2:
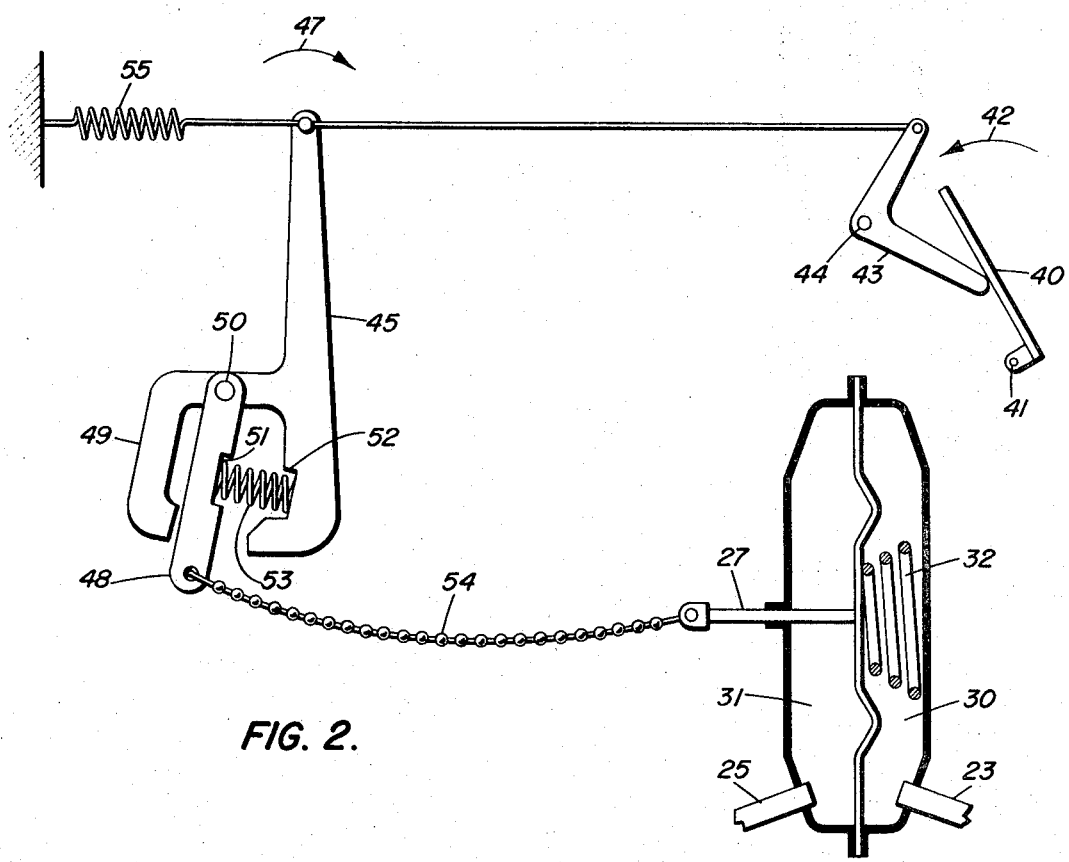
FIG. 2 shows a simplified mechanical connection between the inventive system and the vehicle fuel control which is useful in explaining the operation of the system.

FIG. 2 shows a simplified linkage for connecting lever 27 to fuel control 29. In FIG. 2 the accelerator pedal 40 is depressed by the foot of the driver to cause acceleration of the vehicle. Pedal 40 then rotates counterclockwise about pivot 41, as indicated by arrow 42. Depression of pedal 40 causes it to act against crank 43 resulting in a clockwise rotation about pivot point 44. Crank 43 is connected to lever 45 through connecting rod 46, consequently rotation of crank 43 results in a clockwise rotation of lever 45 about shaft 50 as indicated by arrow 47. Toggle 48 is attached to the fuel control valve of the vehicle by the shaft 50. The fuel control valve is a part of the carburetor of the vehicle. The connection of toggle 48 to shaft 50 is such that rotation of toggle 48 causes rotation of shaft 50. Bumper 49, which is integrally attached to lever 45 also rotates about shaft 50. However, bumper 49 freely rotates about the shaft so that rotation of the bumper would not ordinarily cause rotation of shaft 50. Two spring retaining indentations 51 and 52, respectively, contained in toggle 48 and lever 45, serve to retain a compression spring 53. Toggle 48 is biased against bumper 49 by the action of spring 53. A bead chain 54 connects toggle 48 to lever 27 of air motor 24. Chain 54 prevents the application of a compression force onto lever 27 when toggle 48 is rotated by lever 45. The operation of the linkage when under control of the driver is initiated by the depression of pedal 40 by the driver. As explained hereinabove this results in a clockwise rotation of lever 45 about shaft 50. Lever 45 is free to rotate about shaft 50 and therefore the angular motion is transmitted to toggle 48 through bumper 49. Toggle 48 is biased against bumper 49 and the toggle and lever consequently move as a unit. The rotation of toggle 48 causes shaft 50 to rotate and the fuel input to the vehicle is increased resulting in an increase in the speed of the vehicle. When the driver no longer depresses pedal 40 tension spring 55 pulls lever 45 counterclockwise returning all elements to their normal positions.

When the velocity of the vehicle reaches the permitted maximum lever 27 is moved to the right, as shown in FIG. 2. This causes bead chain 54 to pull against toggle 48. The pulling force is sufficient to overcome the force of spring 53 and toggle 48 rotates in a counterclockwise direction causing shaft 50 to rotate. Rotation of shaft 50 causes the vehicle to decelerate as explained previously.

It should be noted that pedal 40 is not moved when air motor 24 is operative. This eliminates the feeling of the driver that he has lost speed control of the vehicle when it is under the control of the limiting system.

When toggle 48 is pulled away from contact with bumper 49 against the force of spring 53 depression of pedal 40 is ineffective in changing the velocity of the vehicle. This is so for two reasons. Firstly, lever 45 freely rotates on shaft 50 and therefore it can only effect a change in velocity when acting on toggle 48. Secondly, toggle 48 is pulled away from bumper 49 and consequently rotation of lever 45 is ineffective in causing toggle 48 to rotate.

The vehicle remains under the control of the limiting system as long as the driver keeps pedal 40 sufficiently depressed to enable the needed fuel to be fed to the vehicle. When the driver removes his foot from pedal 40 spring 55 returns lever 45 to its closed-throttle position. During the return of lever 45 bumper 49 acts against toggle 48 causing it to rotate counterclockwise. Counterclockwise rotation of toggle 48 causes a decrease in fuel supply and a consequent decrease in the velocity of the vehicle. The linkage system herein shown is a simplified exemplary embodiment useful in showing how the limiting system cannot be overridden by the driver. A fully described and preferred embodiment is shown in application Ser. No. 773,600, titled "Linkage for Vehicle Top Speed Limiter" filed by George T. Bata and Raymen F. Emery of even date herewith and assigned to the same assignee as the instant invention.

As mentioned hereinabove the removal of the driver's foot from the pedal 40 automatically causes the deceleration of the vehicle in the same manner as it occurs when the limiting system is not incorporated into or not controlling the vehicle. As the vehicle decelerates the output from control circuit 12 decreases and the limiting function of the system is also decreased. As the decrease in velocity approaches an amount sufficient to cause a complete closing of conduit 18, the system becomes completely inoperative as if it were not incorporated into the automobile. However as the velocity is intentionally increased by the driver, the system automatically begins to take control without the intent or awareness of the driver. It is therefore evident that the system is rendered operative and inoperative by the speed of the automobile without the intentional or necessary action of the driver. It is also evident that the system is rendered operative and inoperative without the setting or resetting of any mechanical or electrical elements. Because the amount of limiting obtained from the system is determined by the speed of the vehicle the system is very stable irrespective of the type of terrain. Another major advantage of the system is the completely automatic actuation and deactuation of the limiting. The stable and automatic natures of the system make it very attractive for maximum speed limiting. However, they also make it useful as a speed control at the maximum speed. By holding the accelerator 37 on the floor the driver can travel at a regulated speed irrespective of hills, curves, etc. When braking is required the foot is removed from pedal 37 and the engine slows the car, the same as if the system were not present. It should be noted, that the engine runs at a rate necessary to obtain the set speed because the system controls the fuel supply. The acceleration and deceleration of the vehicle are therefore determined by the characteristics of the vehicle and its engine.

Although this invention has been described with respect to a particular embodiment thereof it is not to be so limited as changes and modifications may be made therein which are within the spirit and scope of the invention as defined by the appended claims.

We claim:

1. A system for preventing a vehicle having an engine including intake and exhaust means from exceeding a predetermined velocity comprising: means for providing signals proportional to the velocity of said vehicle; means responsive to a pressure differential and having at least one first input for connection to a first pressure source at a first pressure, said first pressure being the exhaust pressure of said vehicle, and at least one second input for connection to a second pressure source; means for varying the pressure of said second source between said first pressure and a second pressure, said second pressure being the intake pressure of said vehicle, as the signals from said means for providing proportional signals change in response to speed changes of said vehicle; connecting means for causing said pressure responsive means to yield an output in response to the variation in pressure of said second pressure source; and linkage means for coupling said connecting means to the fuel control of said engine so that the maximum velocity of said vehicle is controlled by said system.

2. The system of claim 2 wherein said means for providing signals proportional to velocity includes means for sensing said velocity; and said means for varying includes magnetic field producing means actuated by the output of said means for sensing so that variations in said speed result in changes in said second pressure.

3. The system of claim 2 wherein said linkage means includes a mechanical connection between said fuel control and said means responsive to a pressure differential, said mechanical connection fully transmitting tension forces but deforming when subjected to compression forces so that the control of said vehicle by said system cannot be overridden by rotation of said accelerator pedal.

4. The system of claim 1 wherein said vehicle has a speedometer including a magnet, and said means for providing signals proportional to the velocity of said vehicle includes a coil for sensing the change in magnetic flux occasioned by rotation of a permanent magnet; said magnet being the speedometer magnet of said vehicle so that the number of revolutions per unit of time of said magnet is a direct function of the velocity of said vehicle.

5. A system for preventing the velocity of a vehicle having an engine including intake and exhaust means and a fuel control from exceeding a predetermined velocity comprising: means for establishing a magnetic field which varies in accordance with the variation of input signals applied thereto; means for providing said variable input signals, the variation of said input signals being a function of the velocity of said vehicle; pressure storage means for providing an output to a first pressure transmission means; a first input to said pressure storage means for providing a first input at a first pressure, said first pressure being the intake pressure of said vehicle; a second input to said pressure storage means for providing a second input at a second pressure, said second pressure being the exhaust pressure of said vehicle; pressure switching means responsive to said variations in said magnetic field for changing said output from said first pressure to said second pressure; means responsive to a pressure differential; said first pressure transmission means serving as a first input to said pressure differential responsive means and a second pressure transmission means serving as a second input thereto; the pressure input by said second input remaining substantially constant at said second pressure; said pressure differential responsive means generating a control output as the input from said first pressure transmission means varies between said first and second pressures; and means connecting said control output to the fuel control of said vehicle so that the speed of said vehicle is maximized when said pressure differential is maximized.

6. The system of claim 5 wherein said means for providing said variable input signals includes a control circuit the output of which increases as the velocity of said vehicle increases toward said predetermined value so that said output is maximized at said predetermined value; said means for establishing a magnetic field includes a coil receiving said output; the magnetic field of said coil acting on said pressure switching means to effect switching thereof.

7. The system of claim 6 further including first fluid passage means for connecting said first input to said pressure storage means to the intake manifold of said vehicle and second fluid passage means for connecting said second input to said pressure storage means to the exhaust system of said vehicle.

8. The system of claim 7 wherein said means connecting includes resilient means for causing said means connecting and the accelerator pedal of said vehicle to move together when said vehicle is accelerated by said pedal to move separately when said vehicle is accelerated by said means connecting; and compression deformable means for causing said accelerator pedal and said connecting means to move together when said vehicle is decelerating so that control of said vehicle by said system cannot be overridden by actuation of said pedal.

9. The system of claim 5 wherein said means for providing said variable input signals includes a speed sensor having a rotating permanent magnet, the rotation rate of said magnet being proportional to the velocity of said vehicle; and a coil located in the proximity of said magnet so the frequency of the output of said coil is indicative of the velocity of said vehicle.